US010210533B2

(12) United States Patent
Redlich

(10) Patent No.: US 10,210,533 B2
(45) Date of Patent: *Feb. 19, 2019

(54) REVENUE SHARING SYSTEM THAT OPTIMIZES AD REVENUE WITH PREFORMATTED PAGE GENERATOR AND PREVIEW DISTRIBUTION SYSTEM

(75) Inventor: Daniel Redlich, Miami Beach, FL (US)

(73) Assignee: Redgage LLC, Miami Beach, FL (US)

( * ) Notice: Subject to any disclaimer, the term of this patent is extended or adjusted under 35 U.S.C. 154(b) by 1819 days.

This patent is subject to a terminal disclaimer.

(21) Appl. No.: 12/274,668

(22) Filed: Nov. 20, 2008

(65) Prior Publication Data

US 2009/0132373 A1    May 21, 2009

Related U.S. Application Data

(60) Provisional application No. 60/989,183, filed on Nov. 20, 2007.

(51) Int. Cl.
   *G06Q 30/02*    (2012.01)
   *G06Q 40/00*    (2012.01)

(52) U.S. Cl.
   CPC ......... *G06Q 30/02* (2013.01); *G06Q 30/0239* (2013.01); *G06Q 40/00* (2013.01); *G06Q 40/12* (2013.12)

(58) Field of Classification Search
   CPC .................................................... G06Q 30/02
   USPC ........................................................ 705/14
   See application file for complete search history.

(56) References Cited

U.S. PATENT DOCUMENTS

| 2008/0275763 A1* | 11/2008 | Tran et al. .................. 705/10 |
| 2009/0006375 A1* | 1/2009 | Lax et al. .................. 707/5 |
| 2009/0024923 A1* | 1/2009 | Hartwig et al. ............. 715/716 |

OTHER PUBLICATIONS

"24/7 Real Media Announces open AdStream 6 network edition, bringing sophisticated ad management capabilities to online advertising networks." (Jun. 29, 2006). Business Wire Retrieved from https://dialog.proquest.com/professional (Year: 2006).*
Veremedia Requirements, Nov. 19, 2008, http:-veremedia.com/publishers/ requirements.htm.

(Continued)

*Primary Examiner* — Kambiz Abdi
*Assistant Examiner* — Michael R Stibley
(74) *Attorney, Agent, or Firm* — Robert C. Kain, Jr.

(57) ABSTRACT

The method and system of merges user-supplied electronic content with relevant ads based upon relevancy factors discerned form the ads and the content. Further, profiles and session histories of user-visitors are monitored and ad relevancy factors discerned form the profiles and session histories are employed to obtain user-relevant ads. The content relevant ads and user relevant ads are inserted into a preformed web page in addition to the user-supplied content. A revenue splitting module shares the ad referral or sales revenue from the click throughs to advertiser designated web sites. The relevancy factors relate to one or more of the supplied content, the user who uploaded the content, the user profile (previously input by the user), current session history, past session history, the user-group profiles and any user referral source. A comparator matches relevancy factors and ads. Ad selection by category, hierarchical or orthogonal match and high pay referral fees.

13 Claims, 10 Drawing Sheets

(56) References Cited

OTHER PUBLICATIONS

Scan Scout Network, Nov. 19, 2008, http:-www-scanscout.com/join_now.html.
Consorte, Nov. 19, 2008, http:-www-consortemedia.com/ad_network/signup.php.
Ad Mob, Nov. 19, 2008, http:-www-admob.com/s/home/register/?iphone=I.
Glam Media, Nov. 19, 2008, http:-www—glammedia.com/publishers/glam_publisher_network/site_requirements.php.

* cited by examiner

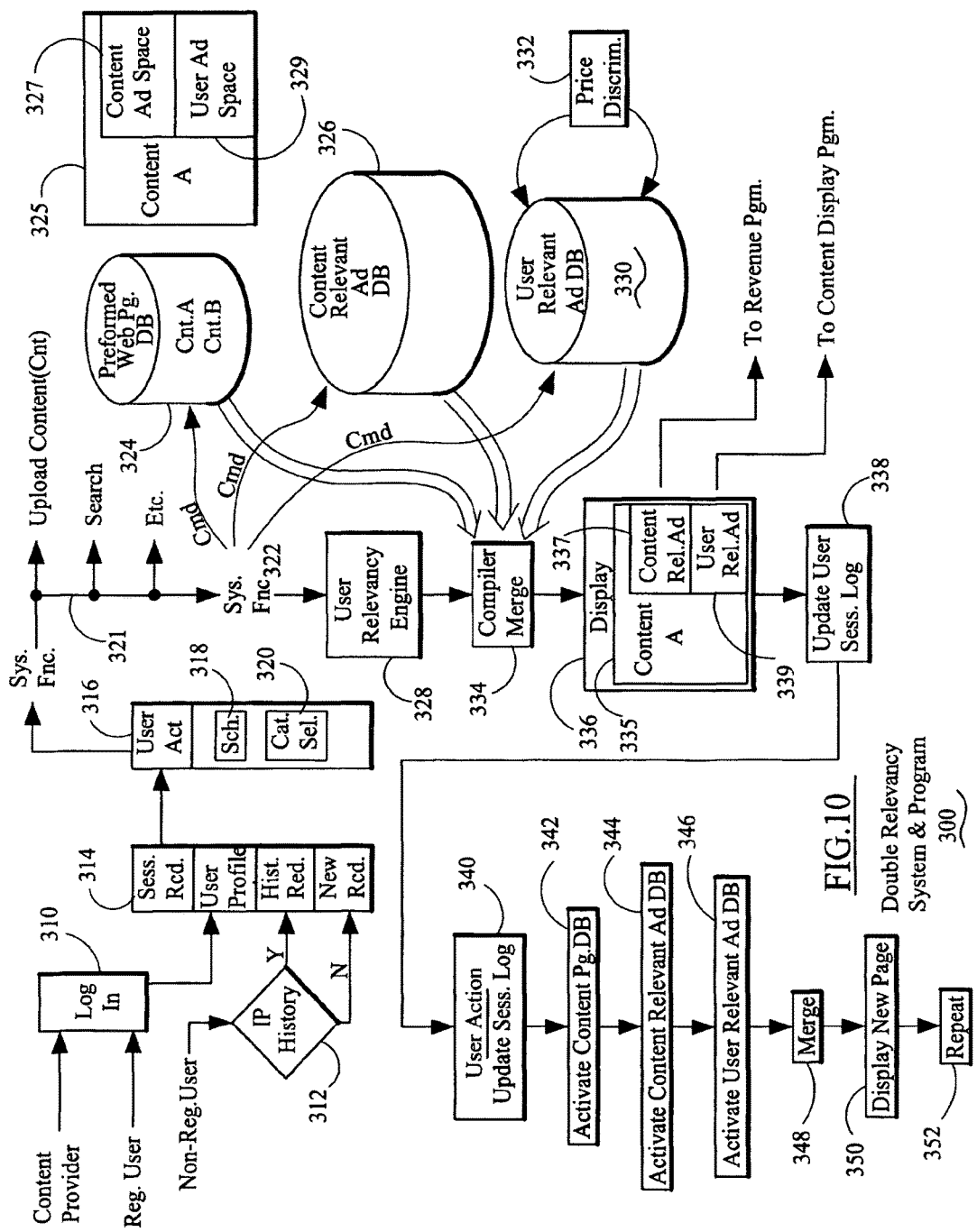

REVENUE SHARING SYSTEM THAT OPTIMIZES AD REVENUE WITH PREFORMATTED PAGE GENERATOR AND PREVIEW DISTRIBUTION SYSTEM

The present application is a regular patent application claiming priority and the benefit of provisional patent application Ser. No. 60/989,183 filed Nov. 20, 2007, the contents of which is incorporated herein by reference thereto.

The present invention relates to an Internet based system which generates a plurality of web site pages by merging user supplied content with relevant advertisements. Further, the web site server extracts a preview of the user content and distributes these previews throughout the Internet creating a viral distribution and wide spread exposure of the user's content. The system also includes a revenue sharing component distributing ad referral fees to the content providers, among others. A computer based method is disclosed herein as well as an information processing system and programming instructions stored on computer readable medium.

BACKGROUND OF THE INVENTION

With a variety of software tools, users can easily upload content and post that content on the Internet. Examples of content include text entries, such as documents and written textual materials, for example, materials posted on various blogs, video content such as user supplied content on Google videos, YouTube and MySpace, and photos taken by users uploaded to Flickr, Face book and others. Unfortunately, this user generated content is oftentimes provided free of charge to the web site or system operators. These web site operators place ads next to the user supplied content and receive sales referral fees based thereon. The users who created the content do not monetary benefit from the distribution and display of such content. Further, some Internet platforms do not accept all types of user generated content.

In general, many of these systems, which enable a user to post user generated content, do not renumerate the user content provider in any manner, such as sharing ad revenue derived from other visitors seeing the user supplied content and then clicking through to advertiser designated web sites to purchase goods or services thereon.

OBJECTS OF THE INVENTION

It is an object of the invention to provide a single, simple Internet platform server system which is user friendly and which enables a user to easily post his or her user generated content including text, electronic images or pictures, video, audio or other user created electronic content.

It is a further object of the present invention to provide the user with some type of monetary renumeration if the uploaded content is interesting and generates additional traffic on the web page and web site associated with the content provider.

It is a further object of the present invention to share ad referral revenue with the content provider, the system operator and any other person or entity referring the content provider to the system operator.

It is a further object of the present invention to increase the renumeration to the content provider based upon traffic on the content provider's web page, quality of the content ranked by visitors, and quantity of the content posted on other web pages by the user, wherein the other user supplied content is posted to other web pages supported by the system operator.

It is an additional object of the present invention to increase the renumeration to the content provider based upon content analysis, resulting in relevant ad insertion, and further based upon user-visitor historic analysis (for unregistered user-visitors, based upon referral source, IP address and monitored site history during the present time frame, and for user-visitors that log-in via their user name, based upon user profile) resulting in further insertion of relevant ad materials, thereby increasing the ad revenue for the content provider and the web site operator due to both content and visitor ad relevancy factors.

It is another object of the present invention to provide a preview generator for user supplied content.

It is an additional object of the present invention to provide a distribution system which distributes the previews of the user supplied text, video, audio, or electronic images to other web sites enabling visitors to those other web sites to select a hyperlink back to the original content web page and a full version of the electronic content.

SUMMARY OF THE INVENTION

The method and program and system of merging electronic content from a user includes maintaining a plurality of preformatted web pages on a server system. Each preformatted web page has associated with it one or more advertisements and each advertisement has ad relational data associated therewith. The system and the method determines relevancy factors from the electronic content supplied by the user. These relevancy factors relate to one or more of the supplied content, the source or supplier of uploaded content, the user profile (previously input by the user), the user-group profile and any user referral source. A comparator determines whether there is a match between one or more of the relevancy factors from the uploaded content with the ad relational data. With a successful match, which may be a categorical, hierarchical or orthogonal match, the preformatted web page, with matching relevancy factors and ad relational data, is merged with the user supplied content. In other words, as an example, if the user supplied content is an image of an automobile, a preformatted web page with an automotive theme is selected based upon ad relational data associated with web page advertisements (vehicles, including the lower categories of cars, boats, busses, motorcycles), and the ad relational data is correlated with the content relevancy factor, "automobile," from the uploaded content. Therefore, the picture of the automobile is merged with the "vehicle" preformatted web page due to the relationship between the content relevancy factor and the ad relational data from the advertisement associated with the preformatted web page. The system then publishes the merged web page with the user supplied content and the relational advertisements at an assigned Internet address. The relational ads may also be merged into the web page if such ads are not earlier embedded in the preformatted page.

The method of sharing revenue also employs the use of preformatted web pages, relevancy factors from the electronic content supply by the user, and ad relational data associated with each advertisement in order to generate a merged web page. Additionally, each advertisement includes an ad display (text, image or video) and also a hyperlink to an advertiser designated web site. The merged web page is published on the Internet at the assigned Internet address by the method and server system. The system tracks associated sales referral fees made via the corresponding ad display and hyperlink. The system further shares or splits the associated sales referral fees with the user supplying the content as well as the system operator based upon a predetermined formula. The formula, in various embodiments, accounts for one or more of the supplied content, the frequency of other user supplied content (the amount of uploaded content from a particular user), the user profile, the user-group profile, quality of the content, number of visitors on the web page and, in some situations, the user referral source.

The method and the system of previewing and distributing user supplied content also employs the preformatted web pages and merged web page with the user supplied content and the advertisement having a relationship between the user supplied content and the ad relational data for the advertisement. The system further creates a preview of the electronic content based upon one or more of a thumbnail image of the electronic content, a snippit of the electronic content, a quote from the electronic content and/or a descriptor of the content supplied by the user. The descriptor may be a title or textual description. The system adds a hyperlink to the preview wherein the hyperlink links back to the assigned Internet address for the merged web page. The system then publishes the preview to a plurality third party Internet web sites. In this manner, users electronically traveling over the Internet, who find the previews, can easily click on the preview hyperlink which then transfers the user to the system operator's web site and the full version of the user supplied content. The full version of the user supplied content has relational advertisements, ad displays and hyperlinks. If the traveler or visitor then clicks on the relational advertisement hyperlink, associated sales referral fees are potentially generated if that traveler (visitor) purchases goods or services on the advertiser designated web site.

The method and system also includes a double relevancy ad insertion system merging, into a preformatted web page, content provided by a content provider, content related ads and user-visitor related ads. Further, the method and system shares revenue with the content provider based upon advertisements relevant to the content and advertisements relevant to a user-visitor. The user-visitor is one of a plurality of registered users and non-registered users who view the merged web page. A content relevancy engine determines one or more content relevancy factors from the electronic content supplied by the content provider. A content comparator matches the content relevancy factors with the content ad relational data. A user relevancy engine determines user relevancy factors and a user comparator matches the user relevancy factors with the user ad relational data. One of the user relevancy factors is the session history of the user-visitor on the system operator's web site. A compiler merges, into the preformatted web page, the electronic content, one or more advertisements with matching content relevancy factors and content ad relational data, one or more advertisements with matching user relevancy factors and user ad relational data. Each ad has respective ad displays and corresponding hyperlinks. A publisher places the merged web page on the Internet. A tracker tracks associated sales referral fees made via a user-visitor selected ad display and hyperlink. A revenue sharing module splits associated sales referral fees with the content provider and the system operator based upon a predetermined accounting formula.

BRIEF DESCRIPTION OF THE DRAWINGS

Further objects and advantages of the present invention can be found in the detailed description of the preferred embodiments when taken in conjunction with the accompanying drawings in which:

FIG. 10 diagrammatically illustrates a double relevancy method, system and program.

DETAILED DESCRIPTION OF THE PREFERRED EMBODIMENTS

The present invention relates to a method and a system of merging electronic content supplied by user with preformatted web pages containing relational advertisements, a method and a system for sharing revenue between a user, who supplies electronic content, and a system operator who operates the system, provides a user friendly platform to commercially exploit user supplied content, and a method and system of previewing and distributing user supplied content to a variety of web sites to drive traffic to the system operator site and full versions of the user supplied content thereby driving additional traffic to relational advertisers. Similar numerals designate similar items throughout the drawings.

Figure 1:
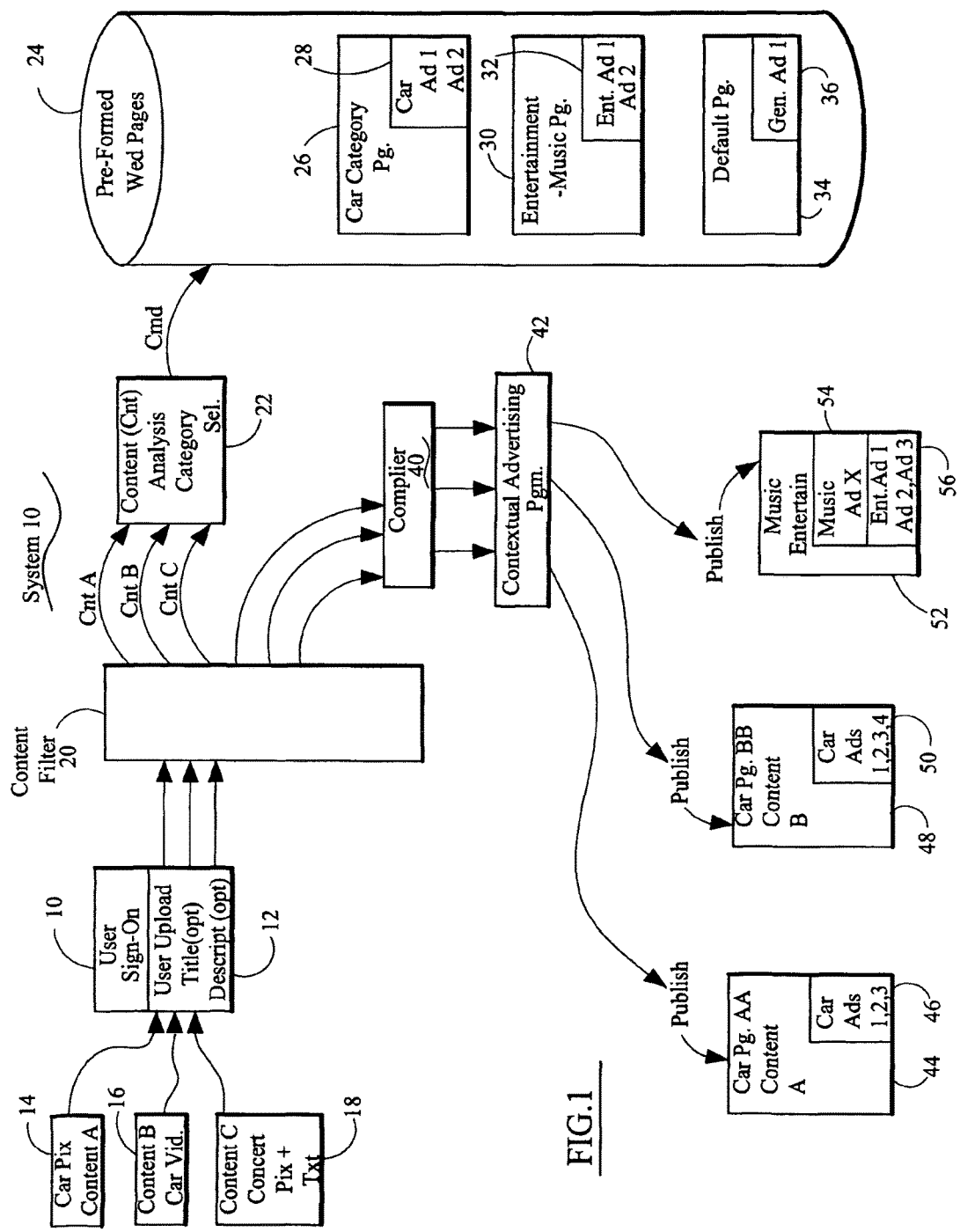
FIG. 1 diagrammatically illustrates both the system and the method for merging user supplied electronic content with preformatted web pages and relational advertisements.

FIG. 1 diagrammatically illustrates the system and the method of merging electronic content, supplied by user, with preformatted web pages having relational advertisements thereon. System 10 is operated by a system operator and generally includes functional components such as content filter 20, content analyzer and category selector 22 (a category comparator), a data collection or database of preformed web pages 24 and relational ads, a compiler integrating the electronic content from the user with the selected preformatted web page and generating a merged web page, a contextual advertising program module 42 and the web site publisher for publishing various merged web pages 44, 48, 52 each having a unique assigned Internet address. The same server address subsumes each respective assigned Internet address for each merged web page, that is, the system operator server address is the same in all the assigned Internet addresses and the merged web pages all have a unique assigned Internet address.

Functional block 10 illustrates that a user must sign on or log into the system. The following User Profile Table shows typical information collected by system 10 when the user initially logs on or signs into the web page publisher system 10.

TABLE A

User Profile

Contact data (including zip code) (name, address, etc.)
User group(s)
Preferences
Negative preferences
System site history
Total time on system site
Hits on page AA, BB
Time on content page AA
Time on page BB, etc.
User's location data
I.P. address, longitude-latitude geographic tags
Search history
Current search
Historic search routes
System site count Q
Upload content to site count Q-content (content count) (# uploads)
Upload comment count Q-critic (critical comment count) (# comments)
Referred by
Referral count Q-refer
For all posted content
   Page rating or rank (1 to 5, 5 being best)
  Rating aggregate
Total sales referral fees (plus fees per content page)
Content provider account balance
Referrer account balance Of course, the user profile may contain other information that enables the system operator to either generate additional relational advertisements or exclude advertisements (negative preferences) and generate additional traffic to the merged web pages. As noted in functional block 12 of FIG. 1, the user uploads content and optionally (OPT) adds a descriptor title to the uploaded electronic content and/or a description or descriptor of the electronic content. Abbreviations found in the drawings and sometimes used in this specification are identified later in the Abbreviations Table near the end of the specification. The user need not identify a title or descriptor for the uploaded content. In the example shown in FIG. 1, the user uploads Content A, which is an electronic image or picture of a car, as functional block 14, uploads Content B, which is a video of a car at functional block 16, and uploads Content C, which is a picture from a concert and text (txt) describing the concert event at functional block 18. The user function 12 uploads each of these contents A, B, C at different times. The content count is then set at 3 uploads. Of course, a plurality or a number of users log into the system and complete their respective user profiles (Table A) and are permitted to then upload a large volumes of content onto web-based system 10 provided by the system operator. Commonly, a user uploads one content into the system 10 at one time. Content A, B, C is shown in order to explain the relational advertisements and the merger with preformed web pages.

In system 10, content filter 20 processes the uploaded Content A, B, C from the user. The content filter 20 sometimes operates on the content itself such as the text in Content C. This semantic analysis of the content enables the system to identify, potentially, the band, the event, or the site (location) of the concert. Therefore, if the uploaded content is text, the relevancy factors of the content are found in the supplied content itself (semantic analysis). Further, the content may have indicators or meta data indicating the time the photograph or video was taken, the camera which captured the picture or video, the date, as well as the author or creator. Hence, these content relevancy factors are located and extracted by content filter 20. The content may also have geographic data either input by the user upload function 12 as a title or description or may have meta data with geographic location, time of creation, author or creator, as well as other indicia of content relevancy. The I.P. upload address may also have relevancy. The outputs from content filter 20 are content relevancy factors A, B, C associated with Content A, Content B and Content C. The content analysis and category selector 22 determines the hierarchical category of the content. Sometimes, the user will select a category such as "automobiles" for car picture as content A. Other times, with respect to content C, the text may indicate the category. For example, the band Black Eyed Peas may be stored in category selector 22 and the system may recognize the band Black Eyed Peas as being associated with musical entertainment. Therefore, a hierarchical analysis of relevancy factors is employed by category selector 22. Alternatively, or in addition thereto, an orthogonal based analysis of relevancy factors is processed. Orthogonal analysis involves a relationship between two categories at the same hierarchical level. Automobiles can be generally orthogonally classified with motorcycles but both automobiles and motorcycles fall into a hierarchical category of vehicles. Further, semantically based analysis to obtain one or more relevancy factors can be employed by category selector 22.

In any event, a command (cmd) is presented to the database or data collection 24 of preformed web pages. Data collection 24 includes various preformed web pages wherein each preformed web page is associated in some manner with one or more advertisements. The association may be an electronic link, meta data, an index link or may be embedded in the ad image. The ads are also stored in data collection 24. In any event, preformed web page 26 relates to a "car" category page having ad space 28 with car advertisements 1, 2. Either the preformed web page includes the ads 1, 2 or these ads are merged into the page by a compiler. Entertainment preformed web page 30 has a sub category entertainment-music page. Ad block 32 includes a link or an electronic association with entertainment ad 1 and entertainment ad 2. If there is no relationship or match between the content relevancy factors (which would include an analysis of the title and descriptor supplied by the user), then the system activates default page 34 with general ads 1 in ad space 36. The match may employ a comparator using these semantic and classification theories. The command cmd from category selector 22 causes the output of a preformatted web page from collection 24 and an input of the same into compiler 40. Compiler 40 merges the appropriate user supplied content with the related preformed web page which then includes the relational ads. The output of the compiler 40 is an interim web page which is then processed by contextual advertising program 42. The relational data may be embedded in the page as meta data. Otherwise, data collection 24 has an index system for pages, ads and content. The contextual advertising program is known by persons of ordinary skill in the art. One example of a contextual advertising program is the Google Ad Sense program, which adds additional ads or inserts additional related advertisements into a web page. In any event, the merged web page is published at a certain assigned Internet address. Therefore, car page AA is published as web page 44 having content A and car advertisements 1, 2, 3 at ad space 46. Car page BB has a different assigned Internet address (although the same "root" server system address) and includes content B car and ads 1, 2, 3, 4 as generally shown as published or merged web page 48. Web page 52 is music entertainment page having music ad X which as been added by contextual advertising program 42 as well as entertainment ad 1, ad 2, ad 3 in advertising space 56. Note that the preformed web page 30 includes an entertainment ad 1, and ad 2 but the published merged web page includes an additional music ad X. Music ad X is added by the contextual advertising program 42.

Examples of categories which may be employed by category selector 22 is found below in Table B.

TABLE B

Categories

All
Animals
Arts and entertainment
Business
Causes and activism
Comedy
Education
Food
Games
How to
Lifestyle
Movies and television
Music
Nature
News and politics
Science and technology
Sports
Travel Other categories may be added by the system operator.

The design and format of the merged web page may change from category to category or the preformatted web pages may be static. For static pages, one content or category page looks fairly similar to another category page except for the different advertisements. It should be noted that the format of the merged web page is completely within the control of the system operator. The user supplies the content on a web page and the content area is predetermined on the web page by the system operator for system 10.

Regarding the input of the content, the following Table C provides an example of one type of input page.

TABLE C

Example of Operative Input Page

Select tabs (functional buttons) - horizontal top bar
    all content
    blogs
    photos
    videos
    documents
    links
    search
    upload
Select upload type - vertical left side bar
    blog
    photo
    video
    document
    link
View space uploaded item
    content info (see Table D)
    money earned
Select further uploads (functional buttons) - horizontal bottom bar
    rate (pull down list; selected by viewer-user) (1 to 5, 5 is best)
    favorite (permits user-viewer to link to his or her web page)
    flag (indicates special significance)
    tag
    related content (shows thumbnails of related content with
                creator, tags or description, view count,
                money earned, rating-favorite)
Advertisements (includes ad display and hyperlinks)
    right side bar, bottom bar, top horizontal bar Other types of input pages may be utilized.

The following Table D lists the types of electronic content which may be uploaded into system 10.

TABLE D

Upload Content Type

Blog (text)
Photo
Video
Document (text, embedded image, links)
Link

Also with respect to the input, the user may be requested to input a reasonable amount of descriptive information regarding the uploaded electronic content. The following Table E shows typical information requested by the system either prior to uploading the content or shortly after uploading the content.

TABLE E

Content Information

Figure 2:
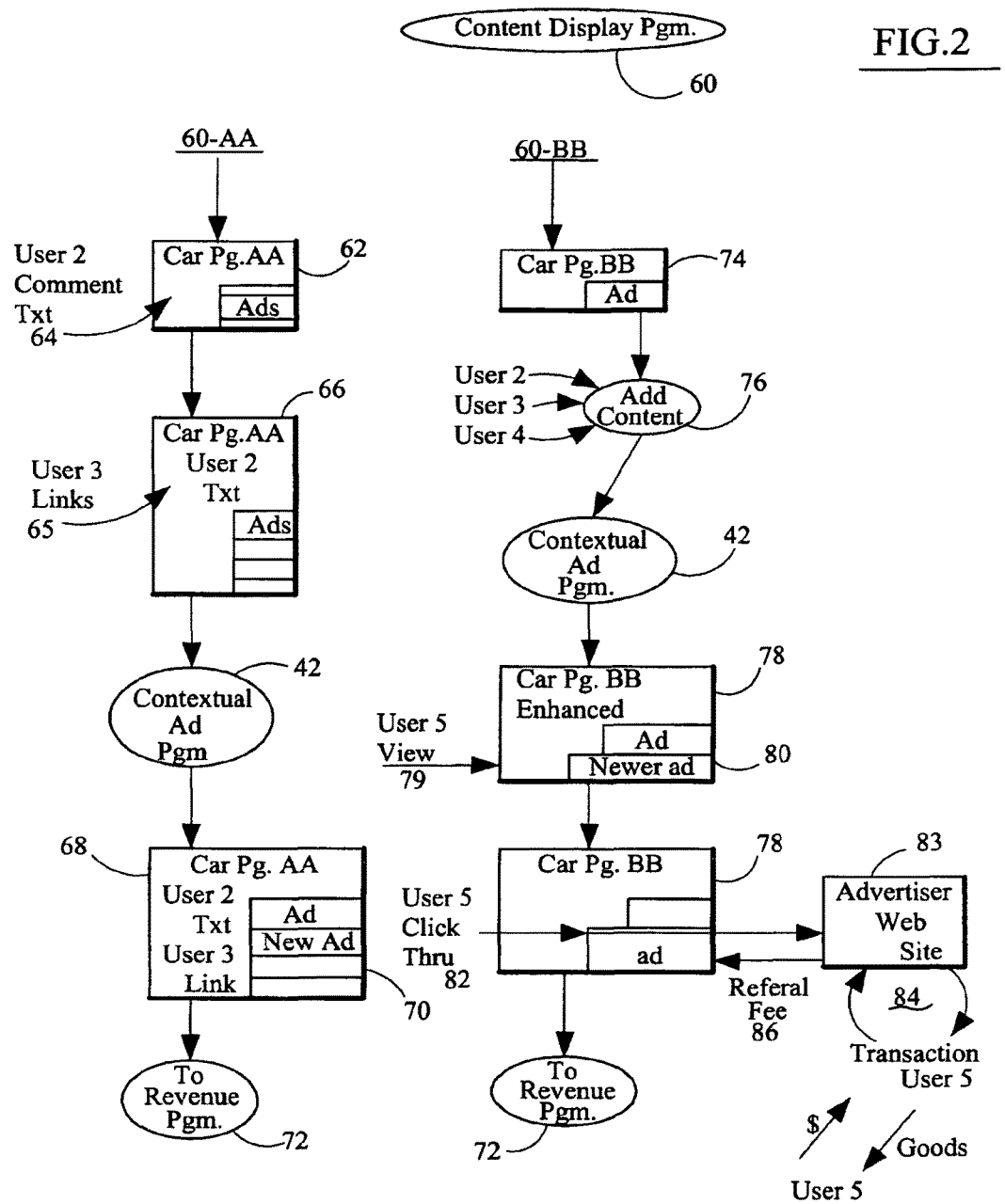
FIG. 2 diagrammatically illustrates supplementing the merged web pages and also generation of the associated sales referral fees when a visitor clicks through a relational ad to a third party advertiser designated web site.

Creator (Author)
Upload time (or time since upload event)
Times rated by viewer-user
Times designated as favorite by viewer-user
Times commented (text)
Description (by uploading user)
Meta tags FIG. 2 diagrammatically illustrates the content display program 60 and, more specifically, shows two processes: content display routine 60-AA referring to car page AA, at one unique, assigned Internet address; and routine process 60-BB for car page BB at a different assigned Internet address. Both addresses have the same server root address. With respect to routine 60-AA, user 2 added comment text 64 to car page AA 62. In other words, the content A, which is a picture of a car (see functional block 14, FIG. 1), is subject to a second user 2 inserting comments as a text at function 64. The comments may be formatted as a blog entry. This increments comment counts in both user profiles (content provider and comment provider). The resulting enhanced car web page AA is shown as web page 66 wherein user 2 text is embedded or inserted or merged into the car web page AA. A third user 3 adds links or hyperlinks 65 to car page AA 66. In functional block 42, the system executes the contextual ad program discussed earlier in conjunction with FIG. 1. Car page AA 68 then includes new ad 70 inserted by contextual ad program 42. Car page AA 68 also includes user 2 text and user 3 link. The system then goes to the revenue sharing program 72 discussed later.

Routine 60-BB begins with car page BB 64. The add content functional module 76 notes that user 2, user 3 and user 4 have added content to car page BB. Functional block 42 indicates that enhanced car page BB has undergone a contextual ad program routine. New ad 80 has been added by contextual ad program 42. User 5 is viewing car page BB 48 as shown at function block 79. In the following block, car page BB 78 has user 5 clicking through a displayed relational advertisement at function 82. This click through activates a hyperlink in the newer ad 80 such that user 5 is transferred to a third party web site or an advertiser designated web site. The advertiser designated web site 83 permits user 5 to engage in a goods or services transaction 84 which, in the example shown in FIG. 2, includes goods being transported to user 5 and user 5 paying money or other compensation to the advertiser designated web site 83. This results in an associated sales referral fee 86 being generated by third party site server and ultimately this sales referral fee is transferred from advertiser designated web site 83 to the system operator supporting car page BB. The associated sales referral fees paid by advertisers or manufacturers supplying the goods or services via advertiser web site 83 are well known as "click through fees" by persons of ordinary skill in the art. Sometimes, third party site 83 pays a fee just for the click through without the need for a sale. These fees are classified herein as sales referral fees. The referral fee 86 is tracked by the system operator operating system 10 as explained later. The tracker is a simple accounting program accepting periodic electronic reports from web site 83 to the system operator at system 10. The reports note referral site 78, the click through, and sales 84. Effectively, the referral fee 86 is logged into and associated with the content user profile as part of the total sales referral fees and unique fees associated with content B on merged car web page BB 78.

Referring to the User Profile, Table A, and to content display program 60, the system accounts for each utilization of each web site established by each content provider-user. Therefore, the system site collects information as to visitor time on content page AA and visitor time on content page BB and also the total visitor time for all the content provided by the user content provider. The user profile also provides information regarding the user's initial log in site such as the source Internet protocol or IP address. The system translates that IP address into geographic longitude and latitude data. This enables geographic relevancy data to be part of the selection process for the preformed web pages 24 (FIG. 1) or the contextual advertising program 42. The system counts total site hits or visits in the user profile, Table A, as the total number of viewers that strike or land on car page AA, as compared with car page BB, or as compared with content page C. The user profile also accumulates data noting how often the user uploads content to any other web pages (newly created web pages) maintained by the system. Commentary textual input on other web pages by the user is counted. Therefore, the user 2 may add comments on car page AA 62 and this increments the user 2 profile and content provider AA. In a similar manner, if the comments supplied by user 2 are critical of the site, the user 2 comment quantity is incremented for user 2 but decremented on the content provider. Alternately, critical comments may not trigger a reduction. User 1 who posted the content A may have the critical count incremented. This indicates that other users have a negative impression of content A. The "referred by" field in the user profile indicates which person or entity referred the content provider user to the system operator. The referral count, Q-referred, indicates how many additional users the profiled user has added to the system operator site (the profiled user refers others to the site). The user profile also includes fields for page rating or ranking by other users and a total aggregate rating. Therefore, rather than inputting textual comments by user 2 and links by user 3, user 2 and user 3 may increment or decrement a ranking for the quality of the content A on car web page AA. The overall ranking is the aggregate of all individual rankings and the number of users commenting or rating the content is also calculated as a quantitative number. Sometimes, the ranking is stored as an index with the web page. In other words, if a hundred users write a particular content this number "100" indicates a high ranking for the content. If the aggregate ranking (1-5) (5 being the best or high quality), shows a qualitative ranking of 4, the system operator knows that the content is a high quality. As noted later, these metrics are used to alter the sharing of referral fee revenues.

Figure 3:
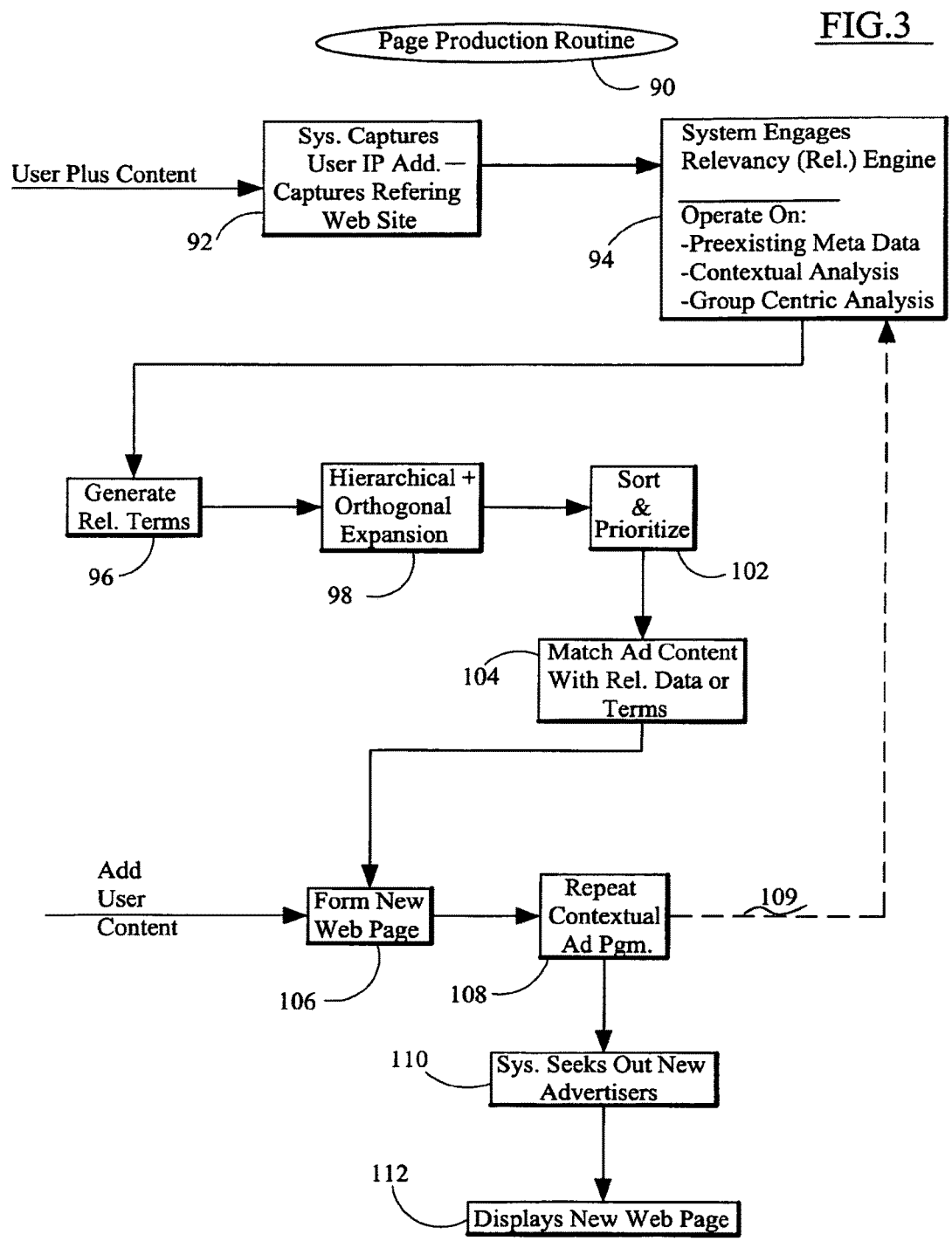
FIG. 3 diagrammatically illustrates the process or page production routine.

FIG. 3 diagrammatically illustrates a page production routine 90. Functional block 92 indicates that the system captures the user's internet protocol or IP address (the source of the upload) and also captures the referring web site, if the user has transferred to the system web site from another website. This user logs in (assuming the user is pre-registered) and submits content to the system as an input. Functional block 94 indicates that the system engages the relevancy engine. The relevancy engine operates on the preexisting meta data in the content uploaded by the user, conducts a contextual analysis of the content of any title or descriptor added by the user during the upload process, and also engages the user's profile to conduct a user centric analysis as well as a user-group centric analysis. An example of a user-group centric analysis is all students that attend University ABC in Any Town, State. A user centric analysis involves, as an example, that the user is a male who lives in Kansas and has interest in vintage automobiles. In contrast, a "student" user having a user address or zip code in New York City is more interested in entertainment, such as Broadway shows, as compared to vintage automobiles. Therefore, the relevancy engine for the user in Kansas provides more automobile related ads such as automobile accessories and automobile entertainment such as NASCAR events. In contrast, the New York City user is provided with more information regarding Broadway shows, concerts in Madison Square Garden, and entertainment events in Atlantic City, N.J.

Functional block 96 notes that the system generates one or more relevancy factors related to either the supplied content, user data from the user profile, predetermined user-group profile and any referral source data noted by the user. The referral source may be the web site from which the user is referred to the system website or a person or company who referred the user. See functional block 92. Functional block 98 indicates that the relevancy factors for the electronic content supplied by the user are further processed based on higher hierarchical categories (see Category Table B or orthogonal expansion from one hierarchical class to another). Functional block 102 sorts and prioritizes these relevancy factors. The sorting-prioritizing function 102 may be based upon prior search history of the user (collected in the User Profile, Table A), the current search history, the purchasing patterns of the user, the purchasing patters of one or more groups associated with the user or other user centric, group centric or historic patterns. Function block 104, a comparator, matches the ad content or, more precisely the add relational data, with the relevancy factors for the user supplied content. The ad relational data is associated with each advertisement and each advertisement has some association with the preformatted web page. For example, in one embodiment, each advertisement may include meta data associated with the advertisement and incorporated in the electronic version of the advertisement and the ad relational meta data can be matched semantically or hierarchically or orthogonally with the content relevancy factors, the user profile, and the user title and descriptor, or other information supplied by the user when the user uploads the electronic content to the system.

Step 106 forms the new web page. This step includes the insertion or merger with user content the preformed web page and the relational ads. Function 108 repeats the contextual advertising program (program 42 in FIG. 1). This may include a repeat, as noted by branch 109, to the relevancy engine 94. In step 110, the system seeks out additional advertisers. This may involve preliminarily posting the merged web page on the Internet with a publishing engine and operating the contextual advertising program 42 on the published web page. Step 112 displays a new web page.

Figure 4:
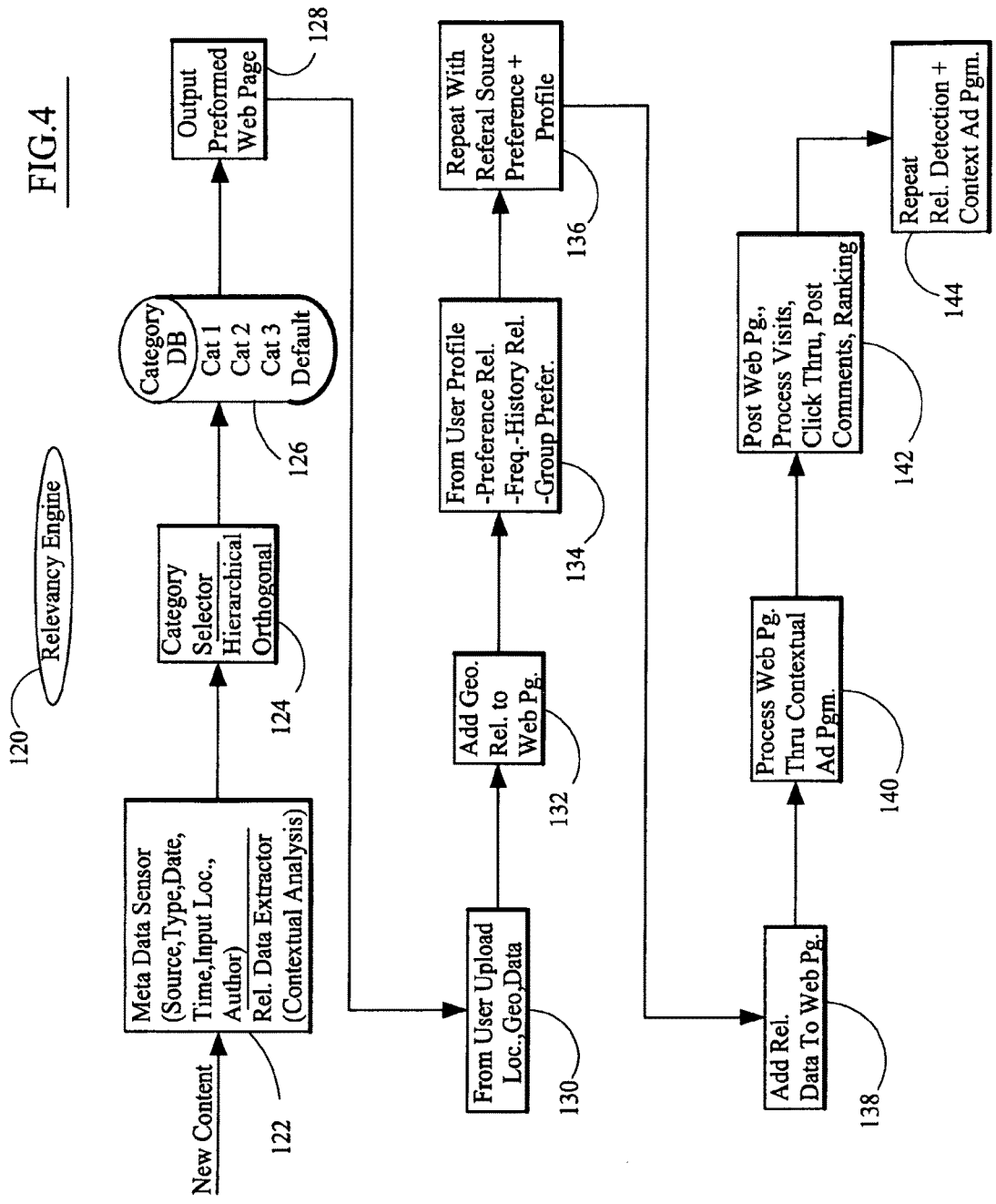
FIG. 4 diagrammatically illustrates the functional modules and the processes for the relevancy engine for the user supplied content.

FIG. 4 diagrammatically illustrates the relevancy engine 120. In functional block 122, new content is added or inputted into the system. Functional block 122 is a meta data sensor which identifies the source of the content, classifies the content by type such as a picture, video, text, blog, etc., identifies the date in the meta data with the content, if available, the time, the location or the IP address from which the content is uploaded, and the author or creator. Further, functional block 122 has a relevancy data extractor which may include a contextual analysis of the meta data. Functional block 124 is the category selector which may employ a hierarchical or an orthogonal expansion routine. The category selector 124 operates on a category database which is electronically linked or indexed to preformatted web pages in categories 1, 2, 3, ads and a default preformatted web page. Output 128 is the preformed web page. Function block 130 obtains the user supplied content and notes the location of the source of the content and the geographic data associated either with the source (IP data from upload source) or the user. Functional block 132 adds geographic relevancy to the web page being formatted. Function block 134 obtains information from the user profile including preferences input by the user during the initial log on (or revision of the user profile), as well as the frequency and history relevancy data from the user profile and the group preferences. In other words, all students from a particular university may be grouped automatically into a group and the preferences of the overall group may be utilized to better obtain relevancy factors for the particular uploaded content. Function block 136 repeats the system with the referral source for the user and the referrer preferences and the referrer profile. In other words, in addition to sharing the advertising revenue with the content provider, the system further shares advertising revenue with the person or entity who referred that content provider. Therefore, the referral source data and preference in the user profile is an additional indicator of relevancy. Function block 138 adds the relevancy factor data to the web page. Function block 140 processes the web page through the contextual ad program. See contextual advertising program 42 in FIG. 1. Functional block 142 posts the web page on the system server, processes visits through the web page, processes click through data to advertisers and advertising sites from that distinct web page, posts comments from other users, and posts rankings of the content on the web page. The relevancy factors compiled for a particular web page may be including as meta data in the page or may be stored in the system database or index associated with the content. These relevancy factors can be utilized to better enhance the relevant advertisement for that content web page. Function block 144 repeats the relevancy detection and repeats the contextual advertising program campaign.

Figure 5:
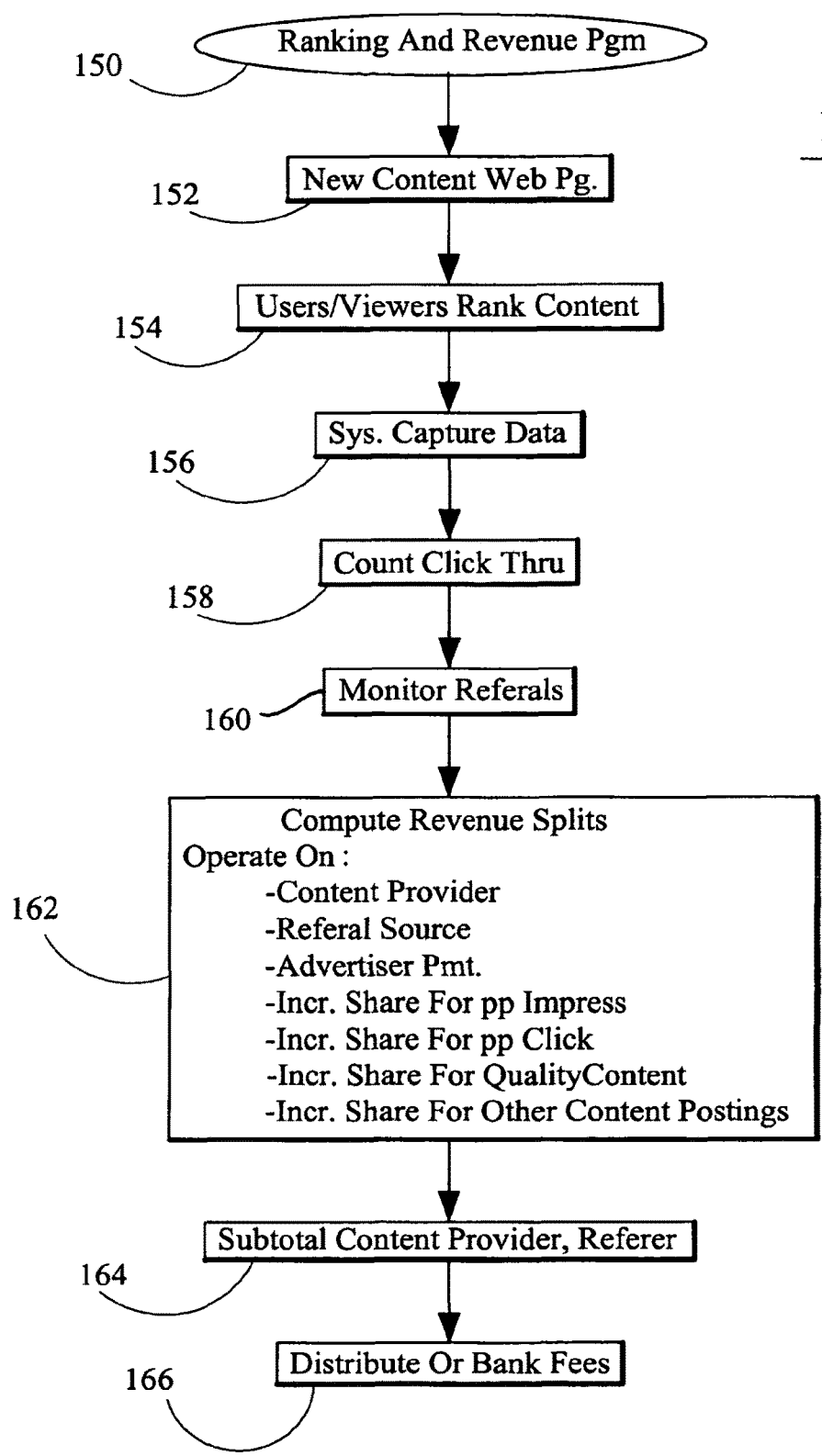
FIG. 5 diagrammatically illustrates the ranking and revenue program and tracking modules.

FIG. 5 diagrammatically illustrates the ranking and revenue program. Functional block 152 notes that a new web page with new content has been published by the system server. A user and viewers to that web page, rank the content on the web page at block 154. In 156, the system captures the data as a qualitative ranking data or a commentary to the content, or a negative comment to the content. Function block 158 counts the number of users or visitors to that new web page. This is illustrated in routine 60-BB in FIG. 2. Function 160 monitors referrals to that web page from other web sites. Function 162 computes the revenue split from referral fee 86 (FIG. 2) for that user supplied content. The revenue split is computed based upon a predetermined formula (which may be changed by the system operator in its discretion). The factors which may be accounted for in the formula include the quality and quantity of content provided by that particular user, the referral source for the content and for the user, total advertisement payments or click through payments from that content and web page. The revenue split to the content provider preferably will be increased based upon the per page impression or views (pp impress). Further, the fee paid to the content provider may be increased based upon the per page click through count, may be increased based upon the quality of the content and may increased based upon other content posting by the user. Negative comments and rankings may decrement the revenue share. In other words, if a user posts 100 instances of new content on 100 web pages, that user's revenue share is increased compared to a user that only posts new content on 5 new web pages. Function block 164 sub totals the information for the content provider and subtotals data for the person or company who referred the content provider. The revenue split by the system operator accounts for the content provider but also the person or company who referred the content provider to the system operator. Function block 166 distributes the revenues or banks the revenues fees for later distribution in accordance with contractual terms with the system operator. Although the revenue share formula is predetermined or pre-set by the system operator, the operator may change the revenue formula to meet economic conditions.

Figure 6:
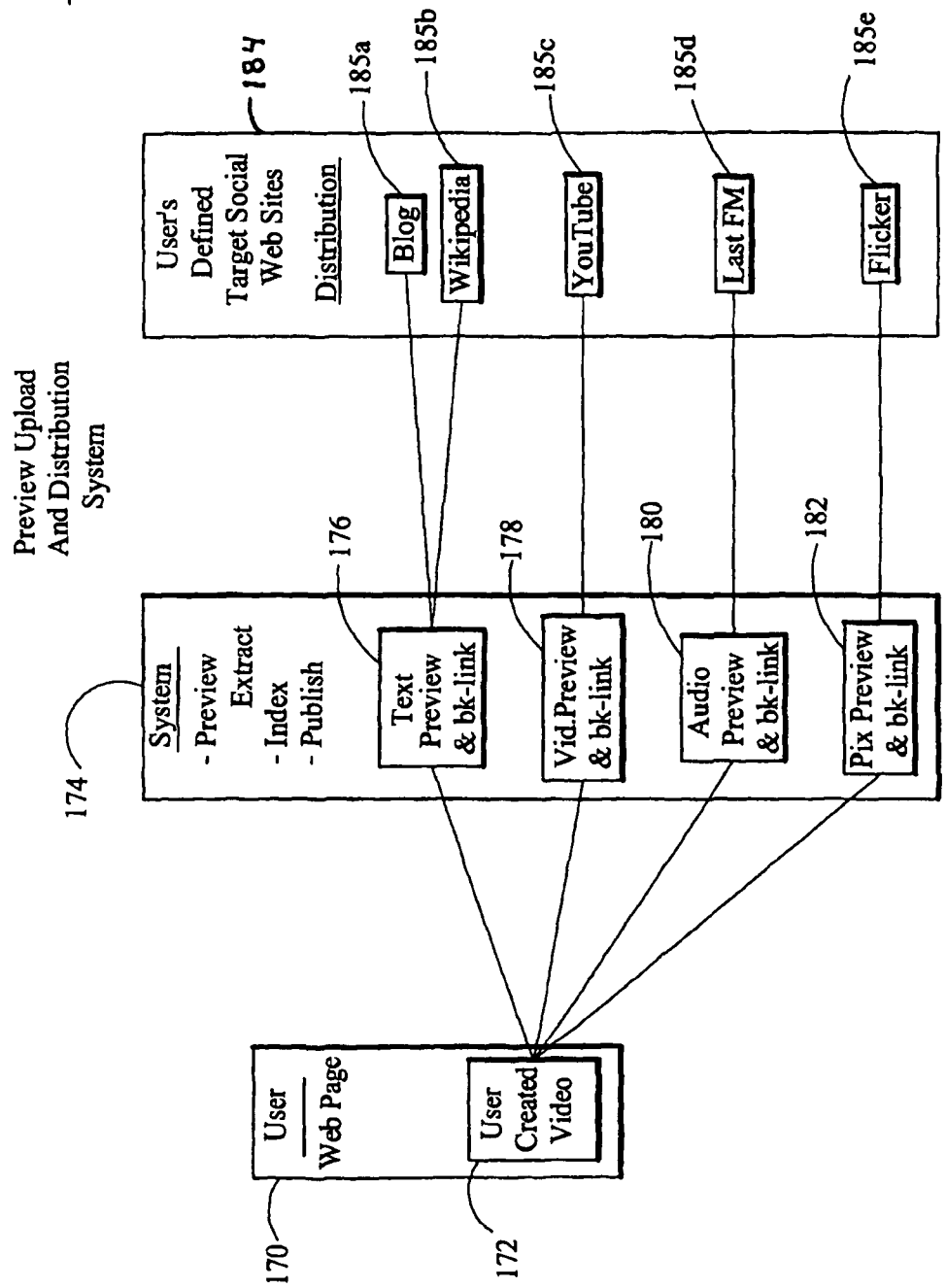
FIG. 6 diagrammatically illustrates the preview upload and distribution system.

FIG. 6 diagrammatically illustrates the preview upload and distribution system. In functional block 170, the user has input an approved web page which has been published by the system operator on the system server. The content on user web page 170 is a user created video 172. The system, in functional block 174, uses a preview extractor for the video as well as an indexing system and a publisher. The preview extractor extracts a preview of the text or script (a short quote) from the user created video as noted in function block 176. Alternatively, the descriptor supplied by the content provider may be used. A snippit of the scrip or text for the user created video 172 includes a portion of the text as well as a hyperlink or bk-link enabling any third party, if they are interested, to click on to the bk-link—hyperlink which would then transfer that viewer from the preview to the user created video 172, on the system server (see pages 44, 48, 52 in FIG. 1). A snippit of the user created video 172 is extracted in the previewer as video preview 178. The publisher in functional block 174 adds a hyperlink to the snippit of the video as a preview. The audio from the user created video 172 is segmented and a preview of the audio track is extracted as audio preview 170. The audio also has a display icon linked thereto with a hyperlink as a bk-link to user created video 172. A single frame picture or image from the user created video is created in function block 182. A thumbnail may be created and distributed. The meta data associated with the user created field may be utilized as the index in module 174. In distributor module 184, the previews are published by the system from function block 174. The user may define targeted social web sites as distribution sites. Therefore, the text preview is posted on blog 185*a* and the text preview is also posted on Wikipedia 185*b*. Of course, any site accepting content or any "Wiki" site may be utilized. The video preview is posted on YouTube 185*c*. The audio preview is posted on Last FM 185*d*. The picture preview 182 is posted on Flickr 185*e*. Therefore, any person interested in the user created content and user created web site from blog 185a, Wikipedia 185b, YouTube 185c, last FM 185d or Flickr 185e can click on the hyperlink from the thumbnail preview and be transferred to the user's web page with the user created video 172 thereon. Of course as explained earlier, the user web page has ad content relevant of the user as well as the group and other content-based items which, hopefully, the visitor will click on the ads, go to the advertiser's designated site, purchase goods resulting in the payment of associated sales referral fees which are ultimately split between the user supplying the content and the system operator and any referral source.

Figure 7:
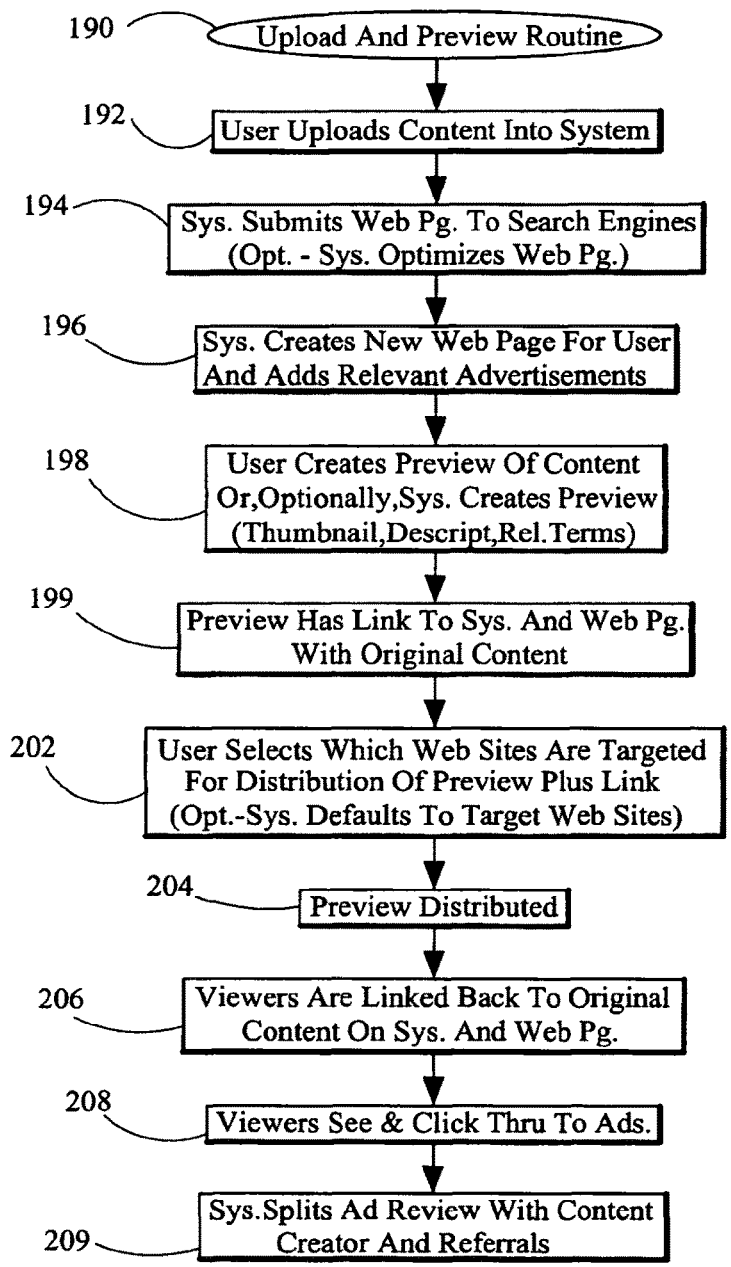
FIG. 7 diagrammatically illustrates the upload and preview routine.

FIG. 7 discloses a functional routine for the upload and preview routine 190. In function block 192, the user uploads content into the system. In function 194, the system creates a new web page for the user and adds relevant advertisement to that new web page. In function 196, the system submits the newly created web page to search engines. Optionally, the system optimizes the web page for better search engine placement. In step 198, the user creates a preview of the content or, optionally, the system creates a preview. The preview could be an thumbnail, a description, a snipppit, a quote from the electronic, content, or a descriptor supplied by the user who, in turn, as supplied the electronic content. Further, commentary by third party users may be added to the preview to enhance consumer interest. In step 199, the preview is modified to include a hyperlink back to the system and to the particular user web page with the original content. In 202, the user selects which web sites are targeted for distribution of the preview plus the embedded hyperlink. Optionally, the system may default to target web sites listed by the user when he or she initially logged in to the system and registered with the system. In step 204, that preview is distributed to other third party publishing web sites. In step 206, viewers are linked from the preview back to the original content on the system server and the original user's web page (see page 52, FIG. 1). In step 208, the viewer sees the web page with the original content and clicks through to advertisements from the web page to advertiser designated web pages. In step 209, the system uses a data tracker to account for sales referral fees and splits ad revenue with the content creator and any referral source of the content creator.

Figure 8:
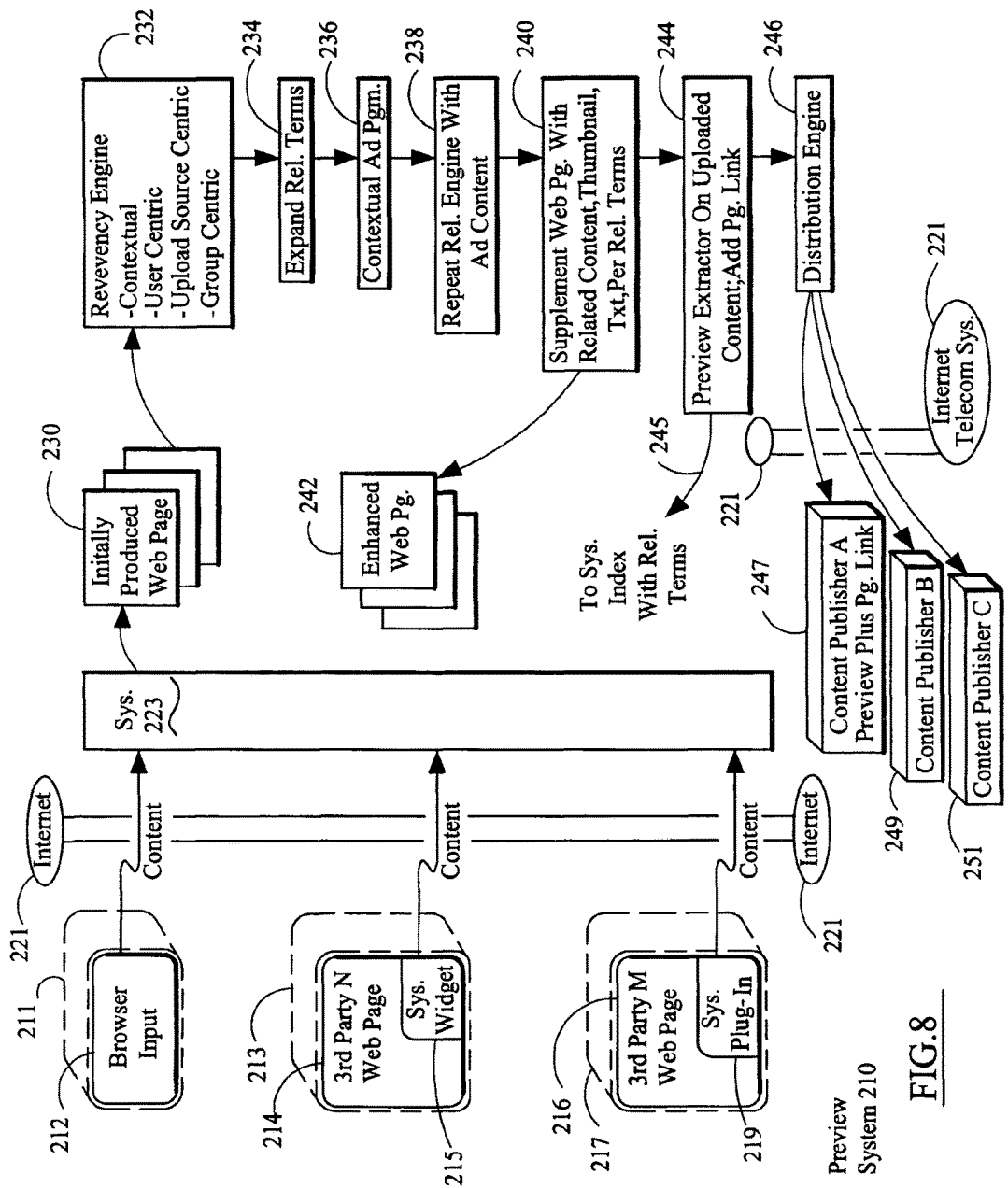
FIG. 8 diagrammatically illustrates the preview system and distribution method and system.

FIG. 8 diagrammatically illustrates the preview system 210. As noted by persons with ordinary skill in the art, the user inputs or uploads content into system 223 via various telecommunications networks commonly called Internet 221. The system operator controls system 223. The user may have a browser input 212 operating on his or her computing device 211, normally designated as a client computer. The client computer 211 may be any computer based device such as a laptop, PC, personal data assistant or an Internet enabled cell phone. Further, as described later herein, the user may activate and download preexisting user controlled content on various third party web sites. For example, third party N may have a web page 214 on third party server 213. The user may upload content from third party server 217 with upload programs from server system 223 and with the permission of third party M. The system, activated either by the user or by the system 223, may extract user content from third party server systems 213, 217 and process that user content as discussed earlier. A widget 215 may be activated on system 213. Another third party web site M 216 has different content on another server system 217. In this instance, the system may have a plug in 219 and third party M web site has granted permission as requested by the user to obtain content from third party M web site owner. In any event, typically, the Internet 221 connection bridges the input system devices 211, 213, 217 with the system 223. The system 223 then initially processes or produces a unique web page 230 which ultimately is assigned a certain unique Internet address. Therefore, for the three web pages initially produced at 230, there will be three assigned Internet addresses.

The relevancy engine 232 operates contextually on the content as well as in a user centric manner and an upload sources centric manner and a group centric manner. The expansion module 234 expands the relevancy factors for the uploaded content. The contextual advertising program 236 adds contextually relevant ads to the web page being produced by the system. Function 238 is a module which repeats the relevancy engine 232 and the contextual ad program 236. The web page is supplemented at supplemental module 240 with related content, thumbnail previews, text and appropriate relevancy terms. The enhanced web pages 242 are then produced and posted on the system operator's web site. As stated earlier, the web page addresses all include a singular server address such that all the web pages have a root server address which enhances the search engine placement of each page on the system server 223.

The preview extractor 244 operates on the enhanced web pages and extracts previews as discussed earlier in conjunction with FIG. 6. The previewer also adds a page link to the enhanced web page 142. Branch 245 sends index terms and relevancy terms to the system 232. This enables anyone who is on the system server to search all the web pages on the server and view other relevant web pages. A distribution engine 246 further pushes the previews to various other publishers or web sites 247, 249 and 251. Content publisher A posts the preview plus the page link to enhanced web page 242. Content publisher B on web site 249 may publish the same preview or a related preview. Content publisher C operates on a third web site 251. These websites at publishers A, B, C are available through Internet or telecommunications system 221 to the distribution engine 246 of the system 223.

Figure 9:
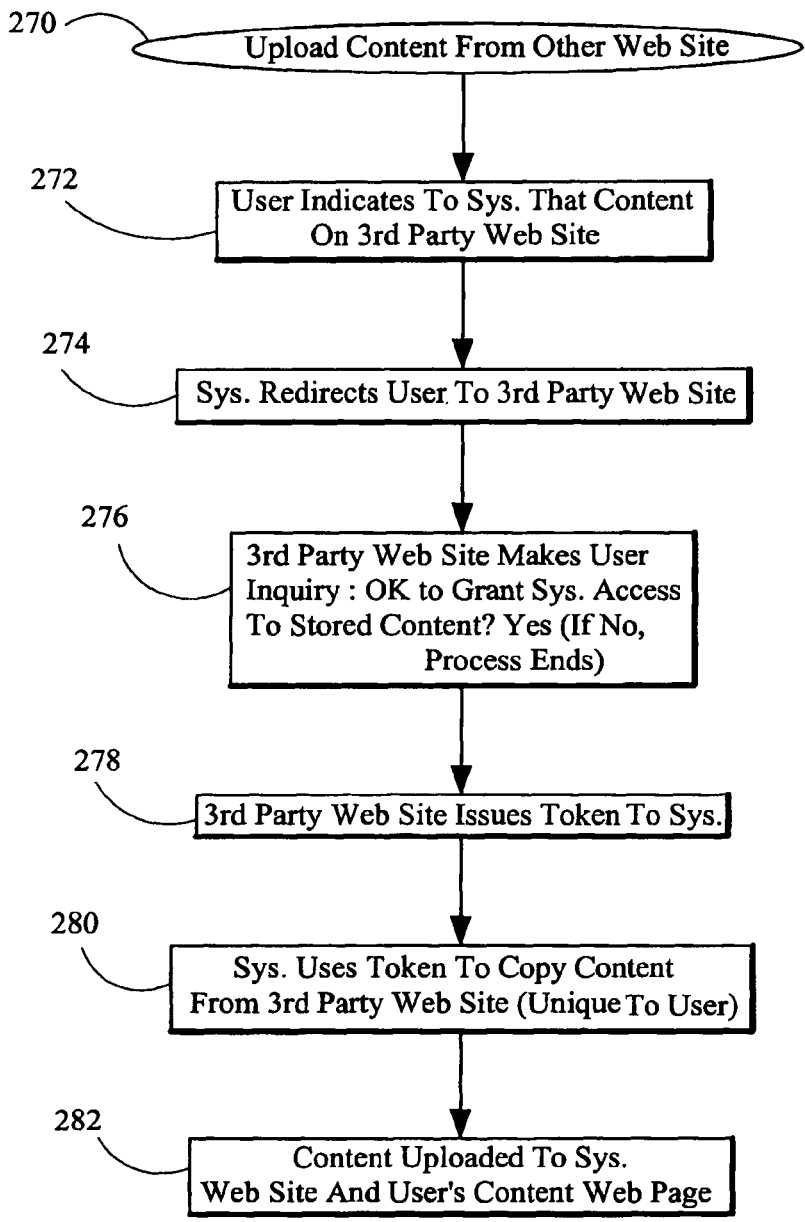
FIG. 9 diagrammatically illustrates a system and block processes (which may be hardware implemented modules) for uploading content from third party web sites, extracting previews and distributing previews to third party sites to drive traffic back to the system operator's site.

FIG. 9 diagrammatically illustrates a process flow 270 for uploading content from another web site. In step 272, the user indicates to the system operator (system 223, FIG. 8), that content is available on a third party web site. The content being "available" on the third party web site must be authorized or approved or created by the user. In step 271, the system operator redirects the user to the third party web site. In step 276, the third party web site makes an inquiry to the user: is it acceptable to grant the system server 223 access to the stored content on the third party's website. If YES, then the process continues. If NO, the process ends. In function 278, the third party website issues a token to the system server for that particular content. In step 280, the system 223 uses the token to copy content from the third party web site, that content being unique to the user, to the system server web site. This is user supplied content. In step 282, the content is uploaded to the system operator's website as user provided content. The following Table lists the type of user supplied content as well as third party web sites where that content may be obtained and identifies the sub-routines permitting the content to be transferred from the third party web site to the system server website. For example, video may be obtained on YouTube by the user activating a Revver API on the YouTube website. The same is true regarding bookmarks and links and comments and photos. For photos, that photo may be located on the Flickr web site and the system web site at Flickr may provide a widget or other routine functionally permitting the authorized user to copy the user supply content from Flickr to the web site operated by the system operator.

| Upload Process: Available Sites and Operation Table |
| --- |
| Video |
|     YouTube, Facebook, MySpace, Google Videos, Yahoo Videos, Dailymotion, Blip.tv, Photobucket, Metacafe Revver, Veoh, Vsocial, Vimeo Upload Operation: Revver API on system site |
| Blogs |
|     Wordpress, Blogger, Typepad, LiveJournal, facebook, technorati Upload Operation: Blog plug-ins or system site |
| Wiki's |
|     Wikia, Wetpaint, Wikispaces, pbwiki, ziwiki Upload Operation: Wiki plugin or system site |
| Bookmarks/Links |
|     Delicious, Facebook, StumbleUpon, Newsvine, technorati, slashdot, tailrank, Digg, Furl, Reddit, Fark, Propeller, Magnolia, bluedot Operation: Toolbar button; sys. Site |
| Comments |
|     Various websites Operation: Toolbar co-comment |
| Photos |
|     Flickr, Photobucket, Facebook, zooomr, scrapblog, smugmug, slide Operation: Sys. website |
| Reviews/Ratings |
|     Amazon, eBay, epinions, CNET Operation: Toolbar |
| Forums |
|     PhpBB, other forum sties Operation: Toolbar |
| Messages |
|     Twither, Facebook, Jaiku, Pownce Operation: Toolbar or sys. site |
| General Social Network |
|     Facebook, MySpace, Linkedin, bebo Operation: Widget, applications |
| Indexed Website |
|     Google, Yahoo, MSN, ASK Operation: Sys. site |

FIG. 10 diagrammatically illustrates a double relevancy method, system and program. It should be noted that although databases 324, 326, 330 are shown and discussed in connection with FIG. 10, the system may access data collections beyond the confines of the local area network on which the system server normally operates. In other words, some of the advertisement databases may be located on other server networks (such as ad networks) and, in order to obtain the relevant ads (keyed to the ad relevancy terms or factors), the system 10 (FIG. 1) accesses those third party databases or data collections via telecommunication channels (such as the Internet) and downloads the relevant ads for later insertion into the preformed web pages as discussed herein. For faster re-loading after initial download from the third party server system or network, the accessed ads may be stored in the ad databases 324, 326, 330.

In general, the double relevancy ad program (a) determines the relevancy between the content provided by a user-content provider; (v) inserts a relevant ad into a defined space in the preformatted web page; (c) the system watches and monitors user-visitors who traverse and travel over the system operator's web site, thereby collecting current session history information about the user-visitor (in the event that the user-visitor is a registered user, then the user profile is further used for ad monitoring purposes, if the user-visitor has earlier visited the system web site, the stored IP address session history is used); (d) the system and program then identifies relevancy terms unique to the user-visitor; and (e) locates associated ads which match the user-visitor relevancy factors and the ad relevancy terms; (f) merges the user-visitor relevant ads into the preformed web page; and (g) publishes the merged ad on the web space and to the user-visitor.

A content provider-user and a registered user log into the system and program 300 at function block 310. The system then notes the user profile and uses the predetermined relevancy factors stored with the user profile to locate relevant ads as discussed above. A non-registered user-visitor also travels through the system and, in decision step 312, the system and program determines whether the user-visitor has previously traversed the system by seeking to match previously stored IP addresses with the current IP address of the user-visitor. In one situation, IP addresses for all user-visitors are stored for a 24 hour period. Other storage times for IP addresses may be employed. The following Table shows data collected by the system and the program 300 to track the current session of the user-visitor through the system. This data is also stored for earlier used IP addresses.

| Non-Registered User-Visitor Session Capture Profile Table |
| --- |
| Current session history on System Server |
| Total current time on system site |
| Hits on page AA, BB |
| Time on content page AA |
| Time on page BB, etc. |
| User-visitor's location data based upon referral I.P. address, longitude-latitude geographic tags |
| Current session search |
| Referred by XX site |
| Referral count Q-refer |
| Posted content - this session |
| Type of content viewed this session |

Function block 314 turns on a "session record" or log function for the site visitor, whether a registered user, or a previous user-visitor or a new user-visitor. Session record employs the user profile (or an index thereto), and the former site session history for a previously recorded IP address user-visitor or opens a new record for the IP address of the new user-visitor. Function block 316 notes the user action on the system web site (multiple web pages on the same system server). This may be a search 318 or a category selection 320. See Categories Table B or Input Page Table C for user selections which are currently available. In any event, the system, in step 316, acts upon the user's input request. The reference, in FIG. 10, to system function ("sys. fnc.") indicates that the system is operating without the display of a web page to the user. System function branch 321 permits an upload of content ("cnt.") as described earlier in FIG. 1, and for example, permits a search over the system web site (multiple pages on the web site), or permits other functions ("etc.") to be activated by the user as noted in Table C above. System function 322 then operates on a content request to get a preformed web page associated with the requested content, or gets a web page associated with the search term input by the user or obtains a default web page. See FIG. 1, for example. A command ("cmd") is issued to the preformed web page database 324. Content A and Content B web pages are shown in FIG. 10. As an example, web page 325 has Content A thereon and "content ad space" 327 and "user ad space" 329 which, in the web page in database 324, are blank ad spaces. If the user conducts a search, the search results may list Content A. It should be noted that the preformed web page 325 may have some "static" or non-variable ads in it but, in the embodiment shown in FIG. 10, some variable or blank ad spaces 327, 329 permit the system and present method to insert more relevant ads into the preformed web page. Ads relevant to both the content and the user's history are located and inserted, typically sorted by referral fee pricing and payments.

System function 322 also issues a command to content relevant ad database 326. This is discussed above in detail. The preformed web page with variable ad spaces 327, 329 and the content relevant ad from database 326 is sent to the compiler for merger of the content ad with the preformed web page. See the double lines in FIG. 10.

The system and method then activates a user relevance engine 328. This relevance engine operates in much the same way as the earlier described relevance engines, but operates on the current session history for the user-visitor, and the user profile if the user is pre-registered, and the earlier, stored IP history if the user-visitor has earlier visited the web site (based on similar IP addresses) and earlier traversed the web site system. A command is sent to the user relevant database 330 and user-relevant ads are output therefrom as noted by the double lines to merger function 334. To enhance the revenue to the content provider (and the system operator), in the event several user relevant ads and or content relevant ads are initially selected, those ads must then be sorted and some de-selected by a price discriminator ("discrim.") 332 which is used to select the highest paying ad, that is the ad with the highest sales referral fee. This is the highest priced ad from the relevant ads initially obtained from content ad database 326 and user relevant ad database 330. It should be noted that the price discriminator may be used with both content relevant ads and user relevant ads. FIG. 10 shows this selector only with user relevant ads.

As a further enhancement of the system and method, advertiser aggregators or ad networks have been created by third parties. These ad networks normally have prerequisites which a particular web site must meet before the ads stored in the ad networks are downloaded to a web site owned by the system operator. The following Tables show ad network criteria, examples of some current ad networks and the criteria for one of the ad networks.

Ad Network Requirements or Criteria Table

Minimum or maximum - page views/unique viewers
Geographic location
Content Type
Language
Contextual Relevancy
Viewer interests
Advertisement sizes (banner size)
Advertisement type (Video ad, widget, banner ad, survey)
Advertisement payment type (CPM, CPC, or CPA) (cost-per-click, or CPC; CPM, cost per thousand impressions; CPA, cost per action/acquisition).

Ad Network Example Table
(referencing ad and web site requirements pages)

Vermedia: English speaking Christian viewers.
(http:- veremedia.com/publishers/requirements.htm)
Scanscout: Video content and a minimum of 1 million US only viewers per month.
(http:- www--scanscout.com/join_now.html)
Consorte Media: Hispanic viewers and CPC payments.
(http:- www--consortemedia.com/ad_network/signup.php)
Admob: Website must be viewed on the iPhone.
(http:- www--admob.com/s/home/register/?iphone=1)
Glam Media: Blog content that is women oriented and a minimum Ad Network Example Table
(referencing ad and web site requirements pages)

of 100,000 viewers per month.
(www--glammedia.com/publishers/
glam_publisher_network/site_requirements.php)

VerMedia Ad Network Requirement Table

Vermedia: English speaking Christian viewers.
All website content must be in English.
The website must attract a Christian or family-oriented audience.
The website must be rich in high quality content.
The website must not contain, produce or link to profane and/or adult content of any kind.
The website cannot contain or be related to anything illegal in nature. This includes but is not limited to web sites promoting mp3, warez, EMU, ROM, or any other form of illegal products or content In order to meet the criteria for a particular ad network, the present system uses the user profile, the prior session history of non-registered users and the current session history of the user-visitor. These session histories permit the present system and method to locate and insert more relevant ads into the preformed web page. Further, the present system and method permits the system to qualify for certain ad networks since the system operator knows what type of user is currently traversing or visiting the system site and knows what content is of interest to the current user-visitor. In addition to the session histories (from the user's profile, from the stored IP address profile and from the current session history), the system determines the type of content the user-visitor is currently interested in by the current and past session histories. The user-visitor content type also provides relevancy factors which directly affect the type of ad and ad network which delivers relevant ads to the preformed page and, more particularly, to the variable ad space for content ads 327 and user relevant ads 329. The Viewer Content Type Table which follows provides and example of the content type which is used by the ad networks and by the system to select the most relevant ad to the user-visitor and the highest paying referral ad for the content provider.

Non-Registered User-Visitor-Viewer Content Type Table

Blog(s) viewed - this session
    high volume content viewer indicates visitor more interested in information rather than
    people; this is "not social" viwer.
Blog comments posted - this session
    High volume comment provider equals "social" viewer
Links uploaded with Comment-Commentary - this session
Pictures viewed
Pictures uploaded - this session
Videos viewed
Videos uploaded - this session
Linking history this session
Links uploaded - this session
Widgets used and/or uploaded - this session
Views of Other Person's Profiles on System
    indicates "social" viewer Once the relevant content ads and the relevant user ads are selected, and the highest paying ads are selected, the system and method in step 334 merges the ads into the preformed web page carrying the Content A. Step 336 is a display or publishing step wherein merged web page 335 is displayed to the user. Web page 335 includes Content A, content relevant ad or advertisements 337 (multiple ads are typically shown) and user relevant ads, shown in space 339. As noted in FIG. 10, the system operates the revenue program and operates the content upload program (if the user-visitor wants to add supplemental content to the web page 335). The revenue program is operated if the user-visitor clicks though the hyperlink in the ad display for the user relevant or content relevant ad in spaces 337,339. In step 338, the system updates the user session log.

In steps 340-352, the system repeats the earlier processes. Step 340 notes the user's action on the web site and updates the user session log based thereon. If the user-visitor looks at many other user profiles (see Content Type Table above), then the system notes this user-visitor behavior and serves up more social site related content or user relevant ads. In other words, the type of content viewed and added to the system operator web ste also provides a relevancy factor or factors about what the user is interested in. These relevancy factors are used to serve up or insert, into the preformed web page, more relevant ads hopefully of interest to the user. Step 342 activates the content page database. See system function branch 321. In step 344, the system activates the content relevant ad database. In step 344, the system activates the user relevant ad database. Of course, the relevancy engines described earlier are activated as part of the utilization of the data bases 324, 326, 330. Step 348 merges the relevant content-based ads and relevant user-based ads into the performed web page with the newly selected Content B. In step 350, the system publishes, with a publisher, the newly formed and merged web page to the user-visitor. Step 352 repeats the earlier steps in an effort to maximize referral ad revenue to the content provider and to the system operator. In this manner, the system and method has a double relevancy ad engine which is based upon content provided and content selected and based upon current and past site session histories of the user-visitor.

General System Description

The following Abbreviations Table lists items shown in the drawings and explained above.

| Abbreviations Table | |
|---|---|
| Admin | Administrator |
| ASP | application service provider - server on a network |
| API | application program interface |
| ad | advertisement |
| bd | board |
| CD-RW | compact disk drive with read/write feature for CD disk |
| comm. | communications, typically telecommunications |
| CPU | central processing unit |
| cat | category |
| cmd | command |
| cnt | content |
| db | data base |
| disp | display or code |
| doc | document |
| dr | drive, e.g., computer hard drive |
| descrpt | description |
| equip | equipment |
| ent | entertainment |
| freq | frequency |
| fnc | function, as in system function |
| geo | geographic location or code |
| gen | general |
| hist | historic as in historic session records |
| I/O | input/output |

| Abbreviations Table | |
|---|---|
| IP | Internet Protocol such as IP address |
| incr | increase or increment |
| loc | location |
| mem | memory |
| mess | message as in SMS or text message |
| obj | object, for example, a data object |
| pgm | program |
| Pro | provider, such as provider of content |
| P/W | password |
| pg | web page |
| pp impress | per page impression or view |
| pix | picture, usually digital picture or image |
| pmt | payment |
| Q | quantity |
| rcd | database record or record profile |
| re | regarding or relating to |
| reg'd | registered as in reg'd user |
| rel | relevancy or relevant |
| req | request |
| rev | review |
| rpt | Report |
| sch. | search |
| sel | select or selector |
| sys | system |
| sess. | session |
| t | time |
| txt | text |
| tele-com | telecommunications system or network |
| URL | Uniform Resource Locator, x pointer, or other network locator |
| vid | video |

Persons of ordinary skill in the art recognize that the users of the method and system employ respective computers or computing devices such as personal data assistants or Internet enabled cell phones to upload content to the operating system. See FIG. 1, content upload 12, user sign-on 10 and the content filter 20 on server system 10, compiler 40 and web page data base 34 all on the server system 10 operated by the system operator. A global telecommunications system or Internet 221 in FIG. 8 enables communication and data transport between a plurality of relatively independent computer systems or computer enabled devices operated by the users. As known, a client-based user computer system includes a monitor or display unit for browser 212 to see the content to be uploaded, an input device or keypad used to issue commands and add textual content to be uploaded to the system, sometimes a command or input device—mouse, and the server system 10 (FIG. 1) has a central processor unit operative with the data base 24. The processor unit operates with a memory and an input/output or I/O device or module. It should be appreciated that the memory represents many types of data storage including hard drives, volatile and non-volatile memory, and removable drives. Also, the I/O represents a plurality of input/output devices which are utilized to couple items which are peripheral to processing unit. The I/O is connected to Internet 221. At the system, a computer is designated as an administrative computer which assists in the overall control and operation of the system and the method described herein. User computers are client computer systems 211 operated by users who upload data via the Internet 221. Third party computing systems 213, 217 are connected to Internet 221 and ultimately to system 223 which operates the method described herein. Other computer servers 247, 249, 251 publish previews via Internet 221.

In a preferred embodiment, the system 10,223 and method are deployed on Internet 221 (FIG. 8) via computer system server 223. The server system includes a CPU, memory units and an I/O and is coupled to Internet 221.

In a preferred embodiment, uploaded content or user visits to the server system 223 are obtained by utilizing a web browser 212 or other type of interface on a user's computer 211 (a client computer) as deployed by server system 223. The information obtained by computer sever system 223 is generally stored in server memory. See, for example, data base 24. Thereafter, the information is processed by server system 223 and the output information representing processed data is delivered to the user computer 211 via Internet 221 or to other web sites or publishers 247, 249, 251, via Internet 221.

Discussion of Hardware and Software Implementation Options

The present invention could be produced in hardware or software, or in a combination of hardware and software, and these implementations would be known to one of ordinary skill in the art. See relevancy engine 232 and the process in FIG. 4. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as a local area network (LAN) or widely distributed network (WAN) over a telecommunications system (such as the Internet) as would be known to a person of ordinary skill in the art.

According to the inventive principles as disclosed in connection with the preferred embodiments, the invention and the inventive principles are not limited to any particular kind of computer system but may be used with any general purpose computer, as would be known to a person of ordinary skill in the art, arranged to perform the functions described and the method steps described herein. The operations of such a computer, as described above, may be according to a computer program contained on a medium for use in the operation or control of the computer, as would be known to person of ordinary skill in the art. The Computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM or other optical memory storage devices, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The claims appended hereto are meant to cover modifications and changes within the spirit and scope of the present invention.

What is claimed is:

1. A method of sharing revenue with a plurality of users, one user supplying electronic content as a content provider user wherein the supplied electronic content is merged with one pre-formatted web page of a plurality of preformatted web pages, a plurality of users supplying a plurality of electronic content, comprising:
    maintaining said plurality of pre-formatted web pages and a default pre-formatted web page,
    and one or more advertisements and each advertisement having ad relational data associated therewith, each advertisement including an ad display and a hyperlink to an advertiser designated web site;
    determining from said electronic content supplied by said content provider user one or more relevancy factors related to one or more of: the supplied content, said content provider user, a predetermined user profile for a visitor user, a predetermined user group profile, and a user referral source;
    matching the determined one or more relevancy factors with said ad relational data and
    merging user supplied content from said content provider user with the pre-formatted web page and one or more advertisements based upon the match, resulting in a merged web page with user supplied content, relational advertisements, corresponding ad displays and hyperlinks;
    publishing the resulting merged web page on the Internet at a respective assigned Internet address;
    tracking at least one of associated sales referral fees or advertising revenue fees made via said corresponding ad display and hyperlink;
    wherein another user of said plurality of users supplying supplemental electronic content as a supplemental content provider user for said resulting merged web page;
    repeating the determination of one or more relevancy factors for said supplemental content and repeating the matching of relevancy factors with said ad relational data;
    merging said supplemental content with further advertisements matching relevancy factors and ad relational data and said resulting merged web page;
    republishing the supplementally merged web page;
    sharing said associated fees with said content provider user, and a user referral source and said supplemental content provider user based upon a predetermined formula accounting for: the supplied content respectively supplied by said content provider user and said supplemental content provider user, frequency of other content from said content provider user and said supplemental content provider user, a predetermined visitor user profile, a predetermined user group profile, and said user referral source; and
    publishing the resulting plurality of merged web pages with respective plurality of user supplied content and relational advertisements on the Internet at respective assigned Internet addresses, each unique to said plurality of electronic content but having the same server address which subsumes each respective assigned Internet address.

2. A method of sharing revenue as claimed in claim 1 wherein determining said one or more relevancy factors includes determining the relevancy of at least the user supplied content by analysis of one or more of: a supplied content source,
a supplied content originator or creator,
a time of creation of said supplied content, a geographic location of creation of said supplied content, and a semantic content of said supplied content.

3. A method of sharing revenue as claimed in claim 1 wherein matching the determined one or more relevancy factors with said ad relational data includes one or more of: a hierarchical-based analysis of relevancy factors and ad relational data, an orthogonal-based analysis of relevancy factors and ad relational data, and a semantically-based analysis of relevancy factors and ad relational data.

4. A method of sharing revenue as claimed in claim 1 wherein said matching includes determining an absence of a match between said user supplied one or more relevancy factors and said ad relational data, and, in the absence of said match, merging said default pre-formed web page with one or more default advertisements, the resulting merged default web page being published with said one or more default advertisements.

5. A method of sharing revenue as claimed in claim 1 wherein said one user is an initial content provider and said one user is one of a plurality of users, others of said plurality of users supplying further supplemental electronic content as further supplemental content providers for said resulting merged web page, the method including:
repeating the determination of one or more relevancy factors for said further supplemental content and repeating the matching of relevancy factors with said ad relational data; and
merging said further supplemental content with further advertisements matching relevancy factors and ad relational data and said merged web page; and
republishing the further supplementally merged web page at said a respective assigned Internet address.

6. A method of sharing revenue as claimed in claim 1 wherein said sharing of said associated fees includes accounting for views by said plurality of users of said resulting merged web page.

7. A method of sharing revenue as claimed in claim 1 wherein said content provider supplies additional electronic content which is processed into additional resulting merged web pages at additional respective assigned Internet addresses, and wherein said sharing of said associated sales referral fees includes accounting for said additional electronic content supplied by said content provider.

8. A method of sharing revenue as claimed in claim 7 wherein accounting for said frequency of other user supplied content includes accounting for said additional electronic content supplied by said content provider.

9. A method of sharing revenue with a content provider supplying electronic content wherein the supplied electronic content is merged into a preformatted web page with advertisements relevant to said content and advertisements relevant to a user-visitor, said user-visitor being one user of a plurality of registered users and non-registered users who view the merged web page, a plurality of users supplying a plurality of electronic content, comprising:
maintaining a plurality of preformatted web pages;
maintaining access to a first plurality of content-related advertisements, each content-related advertisement having content ad relational data associated therewith and a respective content ad display and hyperlink to a corresponding content advertiser designated web site;
maintaining access to a second plurality of user-related (user-r) advertisements, each user-related advertisement having user ad relational data associated therewith and a respective user-r ad display and hyperlink to a corresponding user-r advertiser designated web site;
determining, from said electronic content supplied by said content provider, one or more content relevancy factors related to one or more of: the supplied content, the content provider,
a predetermined user profile for said content provider, a predetermined user group profile for said content provider, and a referral source for said content provider;
matching the determined one or more content relevancy factors with said content ad relational data;
determining one or more user relevancy factors from said user-visitor, said user-visitor relevancy factors related to one or more of: user-visitor session history, a predetermined user-visitor profile, a predetermined user-visitor group profile, and a referral source for said user-visitor;
matching the determined one or more user relevancy factors with said user ad relational data;
merging, into one said preformatted web page, said electronic content supplied by said content provider, said one or more advertisements having matching content relevancy factors and content ad relational data, said one or more advertisements having matching user relevancy factors and user ad relational data, the matching advertisements having respective ad displays and corresponding hyperlinks, thereby forming a resulting merged web page; and
publishing the resulting merged web page with the supplied content and content relational advertisements, ad displays and hyperlinks and user relational advertisements, ad displays and hyperlinks on the Internet at an assigned Internet address;
tracking at least one of an associated sales referral fee or an advertising revenue fee made via a user-visitor ad display; and,
sharing said associated fees with said content provider based upon a predetermined formula accounting for two or more of: the supplied content, a frequency of other content supplied by said content provider, a predetermined user-visitor profile, a predetermined user-visitor group profile, and
a user-visitor referral source;
wherein another user-visitor of said plurality of user-visitors supplying supplemental electronic content as a supplemental content provider user for said resulting merged web page;
repeating the determination of one or more content relevancy factors or the user relevancy factors for said supplemental content and repeating the matching of content ad relevancy factors and user relevancy factors with said ad relational data;
merging said supplemental content with further advertisements, said further advertisements having matching content relevancy factors and user relevancy factors, thereby forming a supplemental resulting merged web page;
republishing said supplemental merged web page;
sharing said associated fees with said content provider user, a user referral source and said supplemental content provider user based upon a predetermined formula accounting for: the supplied content respectively supplied by said content provider user and said supplemental content provider user, a frequency of other content from said content provider user and said supplemental content provider user, a predetermined user profile, a predetermined user group profile, and user referral source; and for said plurality of users supplying said plurality of electronic content, publishing the resulting plurality of resulting merged web pages with respective plurality of user supplied content and content relational advertisements and user relational advertisements on the Internet at respective assigned Internet addresses, each unique to said plurality of electronic content but having the same server address which subsumes each respective assigned Internet address.

10. A method of sharing revenue as claimed in claim 9 wherein said one or more advertisements having matching content relevancy factors and content ad relational data and said one or more advertisements having matching user relevancy factors and user ad relational data, exceed said preformatted web page space and the method includes selecting advertisements for merger based upon a higher referral fees for said designated advertisers.

11. A method of sharing revenue with the user supplied electronic content as claimed in claim 1 wherein said electronic content from said user is preexisting user controlled content from various third party content web sites and the method including activating upload programs to obtain said preexisting user controlled content from said third party content web sites as said electronic content supplied by said user.

12. A method of sharing revenue as claimed in claim 11 wherein the activating of the upload programs to obtain said preexisting user controlled content occurs with one or more of:
- a user granted permission to obtain said user controlled content from said third party content web site;
- user content identified as being available on the third party content web site;
- a user granting authorization or approval to obtain said user controlled content from said third party content web site.

13. A method of sharing revenue as claimed in claim 12 wherein the preexisting user controlled content is obtained by one of a system extraction, download, upload, copy, or transfer process from the third party content web site for subsequent processing by determining relevancy factors and merging.

* * * * *